(12) United States Patent
Green et al.

(10) Patent No.: US 9,518,691 B2
(45) Date of Patent: Dec. 13, 2016

(54) EFFICIENTLY AND EASILY OPENING AND CLOSING A CANISTER VALVE

(71) Applicant: The Coca-Cola Company, Atlanta, GA (US)

(72) Inventors: C. Brad Green, Dacula, GA (US); Devon Browne, Atlanta, GA (US); Joseph Lehman, Atlanta, GA (US); Brent Burchfield, Atlanta, GA (US)

(73) Assignee: The COCA-COLA COMPANY, Atlanta, GA (US)

( * ) Notice: Subject to any disclaimer, the term of this patent is extended or adjusted under 35 U.S.C. 154(b) by 0 days.

(21) Appl. No.: 14/209,856

(22) Filed: Mar. 13, 2014

(65) Prior Publication Data

US 2014/0261711 A1    Sep. 18, 2014

Related U.S. Application Data

(60) Provisional application No. 61/792,889, filed on Mar. 15, 2013.

(51) Int. Cl.
*B01F 3/04* (2006.01)
*F16L 55/07* (2006.01)
(Continued)

(52) U.S. Cl.
CPC .............. *F16L 55/07* (2013.01); *B67D 1/008* (2013.01); *B67D 1/0406* (2013.01); *B67D 1/125* (2013.01);
(Continued)

(58) Field of Classification Search
CPC ....... B67D 1/0406; B67D 1/008; B67D 1/125; B67D 1/12; B67D 1/0021; Y10T 137/8593; Y10T 137/6966
(Continued)

(56) References Cited

U.S. PATENT DOCUMENTS 3,195,777 A * 7/1965 Hart ............................... 222/647
3,617,214 A * 11/1971 Dolac ........................... 222/180
(Continued)

FOREIGN PATENT DOCUMENTS

| EP | 0 364 206 A1 | 4/1990 |
| EP | 1 767 262 A1 | 3/2007 |
| WO | 2011/124702 A2 | 10/2011 |

OTHER PUBLICATIONS

International Search Report and Written Opinion for PCT/US2014/029465 mailed Sep. 4, 2014.

*Primary Examiner* — Donnell Long

(57) ABSTRACT

The present disclosure relates to a method including the steps of receiving a canister in a canister connection housing. The canister includes a canister fitment and a canister valve. The housing includes a receiver fitment and a door. The method includes the step of lowering the receiver fitment of the housing over the canister fitment. The lowering of the receiver fitment is caused by a closing of the housing door. The present disclosure further relates to an apparatus. An apparatus including a nest configured to receive a canister, a door configured to rotate about an angle so as to open and close, a receiver fitment configured to connect to a canister fitment, and an over-center movement mechanism connected to the door and the receiver fitment. The over-center movement mechanism is configured to move the receiver fitment along an axis as the door is rotated about the angle.

9 Claims, 10 Drawing Sheets

(51) Int. Cl.
*B67D 1/04* (2006.01)
*F16L 29/02* (2006.01)
*B67D 1/00* (2006.01)
*B67D 1/12* (2006.01)

(52) U.S. Cl.
CPC .............. *F16L 29/02* (2013.01); *B67D 1/0021* (2013.01); *B67D 1/12* (2013.01); *Y10T 137/0318* (2015.04); *Y10T 137/0402* (2015.04); *Y10T 137/6966* (2015.04); *Y10T 137/8593* (2015.04)

(58) Field of Classification Search
USPC ........ 222/129.1, 182, 402.1, 402.14, 402.15; 137/356, 561 R
See application file for complete search history.

(56) References Cited

U.S. PATENT DOCUMENTS

| | | | |
|---|---|---|---|
| 4,678,106 A * | 7/1987 | Newell et al. | 222/162 |
| 4,960,261 A | 10/1990 | Scott et al. | |
| 5,947,334 A | 9/1999 | Rudick et al. | |
| 7,048,152 B2 * | 5/2006 | Bunoz | 222/182 |
| 8,544,696 B2 * | 10/2013 | Willemsen et al. | 222/181.3 |
| 2003/0097314 A1 * | 5/2003 | Crisp et al. | 705/28 |
| 2004/0251271 A1 * | 12/2004 | Jackson et al. | 222/63 |
| 2008/0116223 A1 * | 5/2008 | Stradella | 222/162 |
| 2010/0224651 A1 * | 9/2010 | Zlatic | 222/182 |
| 2010/0237106 A1 * | 9/2010 | Wolf et al. | 222/402.15 |

* cited by examiner

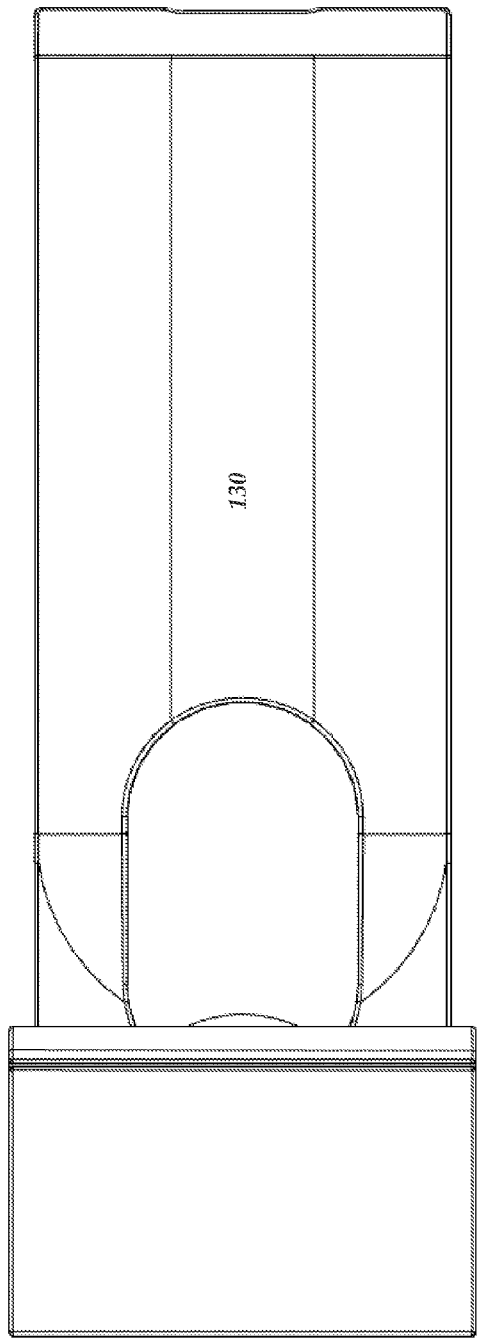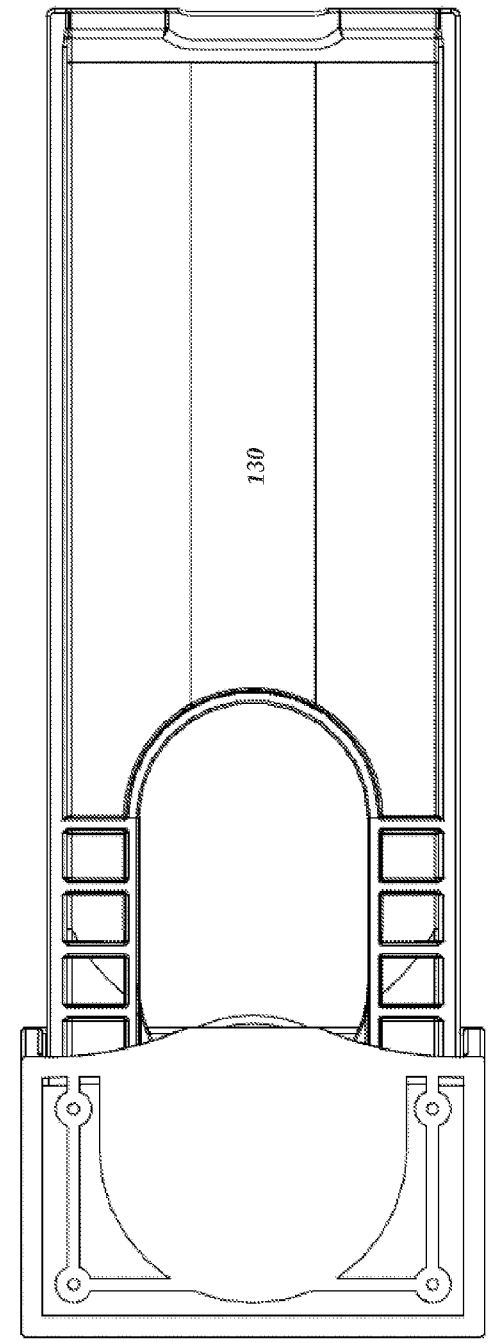

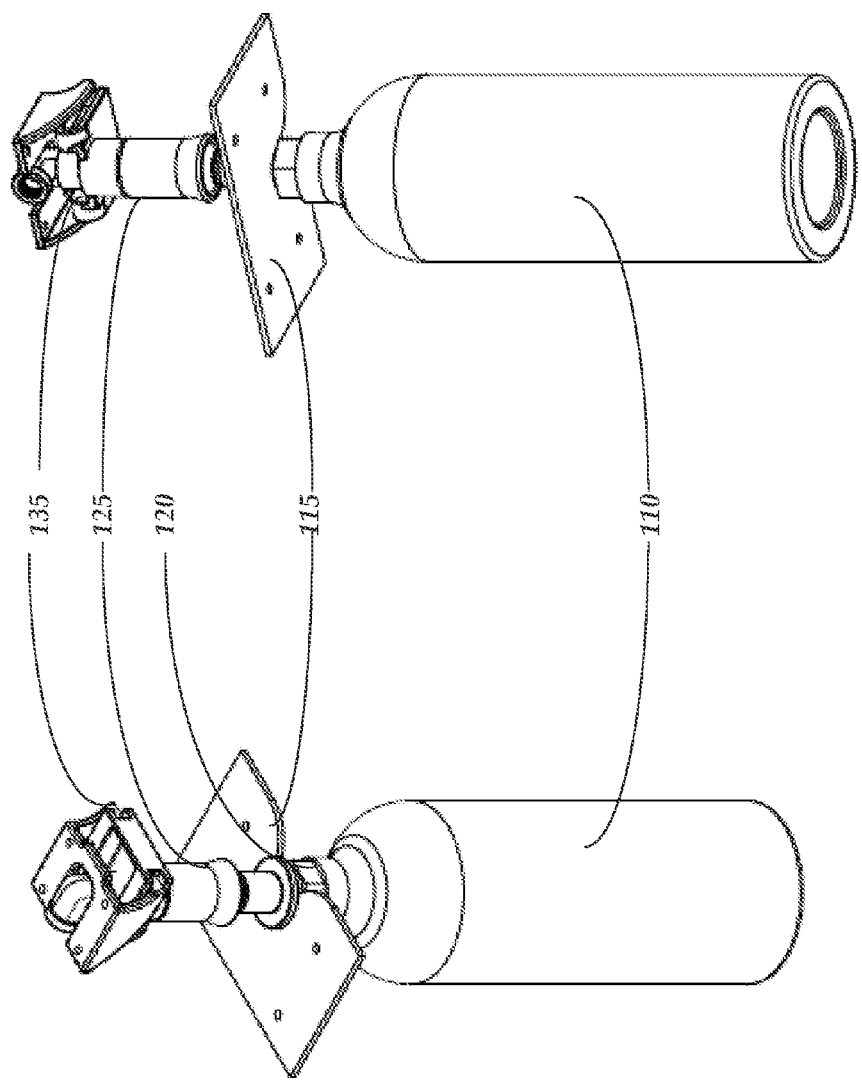

EFFICIENTLY AND EASILY OPENING AND CLOSING A CANISTER VALVE

CROSS REFERENCE TO RELATED APPLICATIONS

The present application is related to U.S. Provisional Patent Application Ser. No. 61/792,889, entitled "Efficiently and Easily Opening and Closing a Canister Valve" and filed on Mar. 15, 2013.

BACKGROUND $CO_2$ gas may leak from a $CO_2$ canister when connecting the canister to an external system. This leakage reduces the amount of useful $CO_2$. The present disclosure addresses this issue and discloses a more convenient and simple connection mechanism.

BRIEF DESCRIPTION OF THE DRAWINGS

The accompanying drawings, which are incorporated in and constitute a part of this disclosure, illustrate various embodiments of the present invention. In the drawings:

FIGS. 8a-8b illustrate different views of a door of the canister connection apparatus, FIGS. 9a-9b illustrate three dimensional views of canister connection apparatus components.

DETAILED DESCRIPTION

Figure 1:
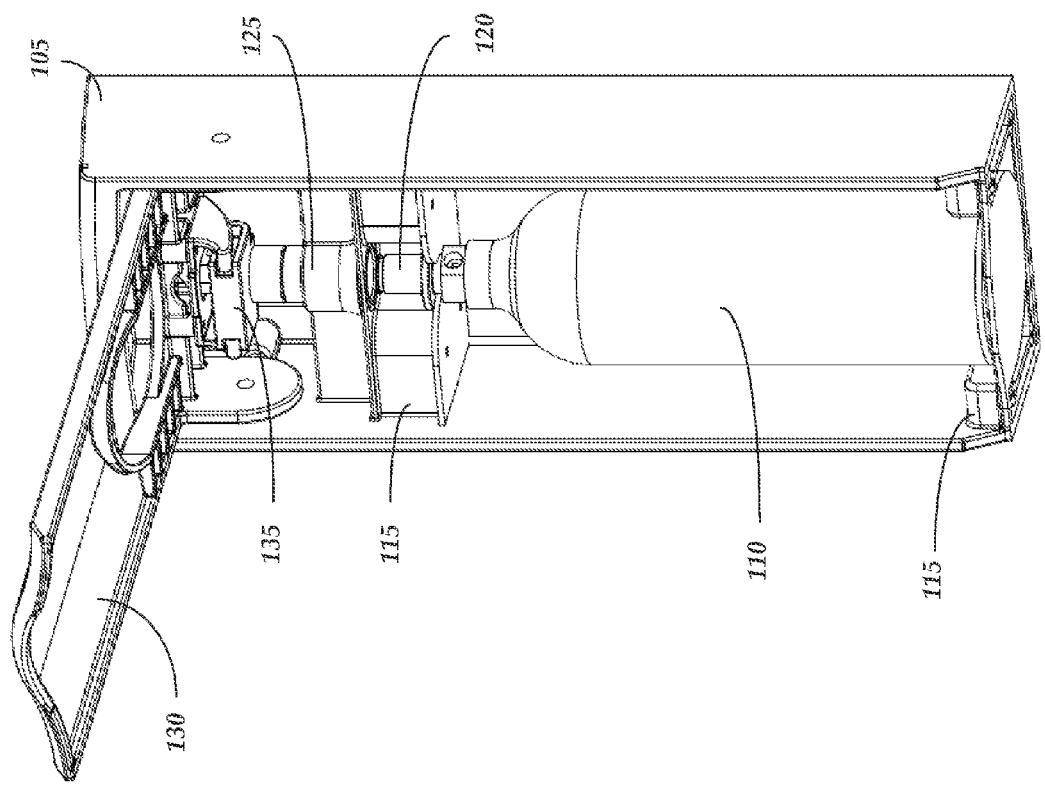
FIG. 1 illustrates one embodiment of a canister connection apparatus.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the invention may provide a canister connection apparatus designed to efficiently and easily connect a pressurized canister to an external system. FIG. 1 illustrates one embodiment of a canister connection apparatus 100. Apparatus 100 may receive a pressurized canister 110 in a housing 105. Housing 105 may be used to connect canister 110 to an external system. Canister 110 may be, but is not limited to, for example, a $CO_2$ canister.

The external system may be, but is not limited to, for example, a beverage dispensing system. Though FIG. 1 shows apparatus 100 to include a canister 110, a canister need not be included as part of apparatus 100. Rather, apparatus 100 may comprise a nest 115 designed to interface with various types of canisters having various volumes. Moreover, the term 'apparatus', as used herein, may include any combination of components or apparatuses.

Canister connection apparatus 100 may be designed to connect canister 110 to the external system efficiently and easily while mitigating the risk of gas leakage. Apparatus 100 may achieve this solution by sealing and covering a canister fitment 120 with a receiver fitment 125. Consistent with embodiments of the invention, apparatus 100 may comprise a movement mechanism 135 that may cause receiver fitment 125 to slide over canister fitment 120 as door 130 is lowered. In other embodiments, apparatus 100 may comprise a mechanism that inserts canister 110, along with canister fitment 120, into receiver fitment 125.

Generally stated, the lowering of door 130 may serve at least two purposes. First, it may cause receiver fitment 125 to connect with canister fitment 120 for opening a canister valve to enable gas flow. Second, it may serve to protect a handler of canister 110 from any leaks that may occur during the connection process by shielding the canister valve from the handler.

As receiver fitment 125 connects with canister fitment 120, a valve opening component of receiver fitment 125 may open the canister valve, thereby allowing gas to flow from canister 110 into apparatus 100 (i.e. charging the apparatus). The charged apparatus 100 may then be connected to (or, in various embodiments, may already be connected to) an external system via, for example, a port in housing 105 and feed the external system with the gas contained in canister 110. In some embodiments, the connection of the receiver fitment 125 with the canister fitment 120 may not in and of itself open the canister valve. Rather, as described in detail below with FIG. 10, a controller 212 may actuate the valve opening component of receiver fitment 125 via a solenoid 216 or other electromechanical device at desired times based on feedback from one or more sensors (e.g. pressure sensor, door sensor, etc.).

Figure 2:
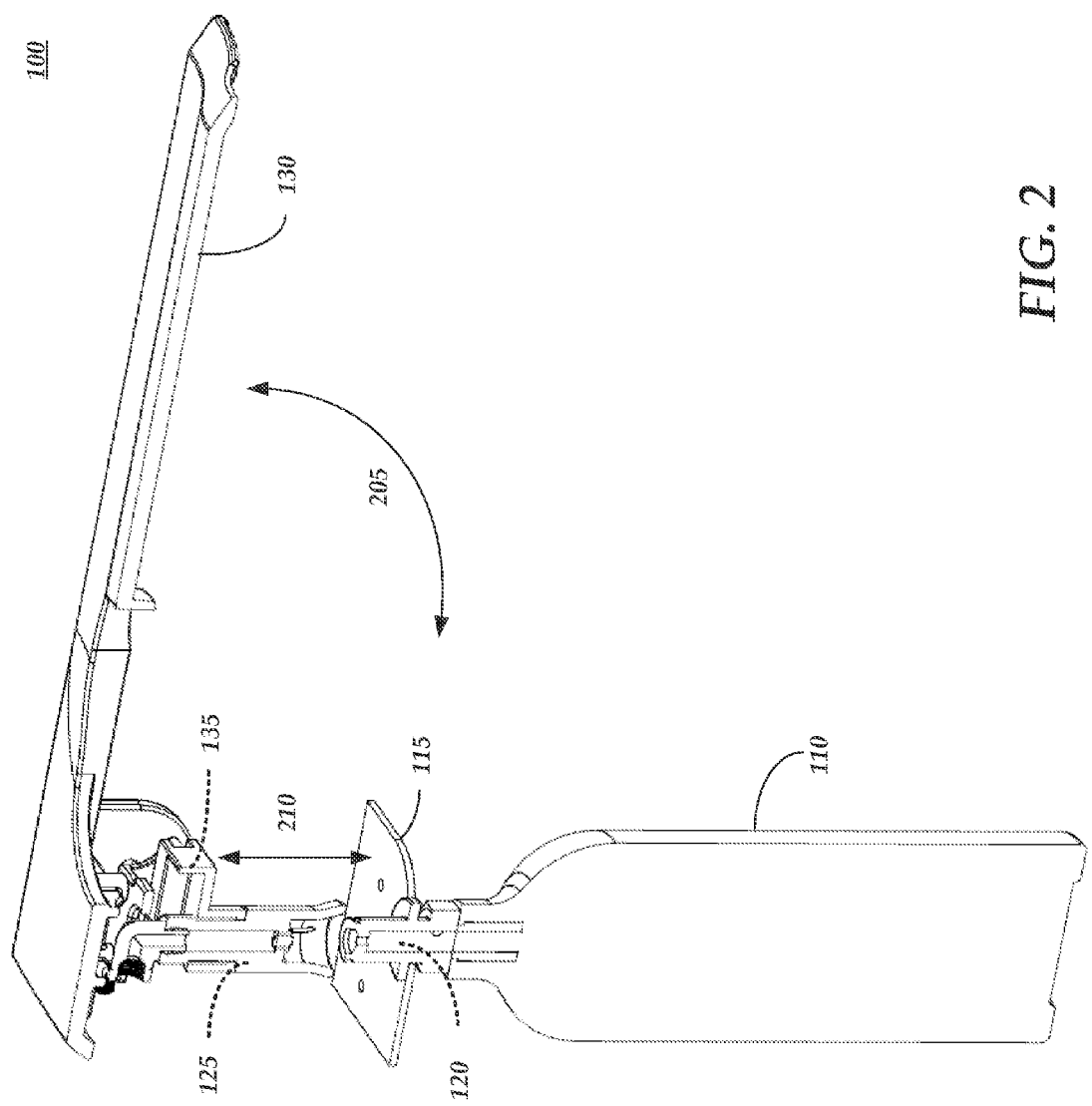
FIG. 2 illustrates a cross-sectional view of the canister connection apparatus.
Figure 3:
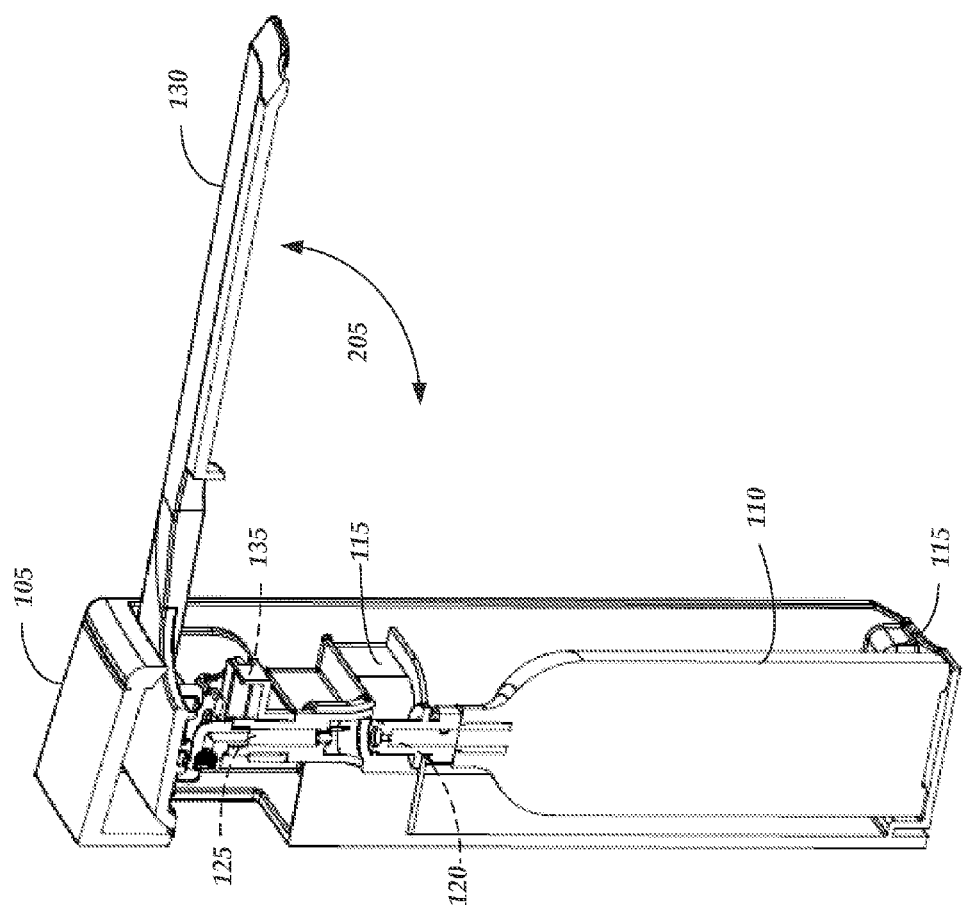
FIG. 3 illustrates another cross-sectional view of the canister connection apparatus.

FIG. 2 illustrates a cross-sectional view of canister connection apparatus 100. A user of canister connection apparatus 100 may first insert canister 110 into canister housing 105. Though housing 105 is not show in FIG. 2, it is illustrated in FIG. 3. Canister housing 105 may be equipped with a canister nest 115 designed to secure canister 110 within canister housing 105. As mentioned above, nest 115 may be designed to receive and secure canisters of various types and sizes within canister housing 105. In various embodiments, the nest 115 may include a landing or other cutout designed to engage with a flange or other corresponding feature on the canister fitment 120 so as to secure the canister in the housing 105 and align the canister fitment 120 with the receiver fitment 125.

The user may then close door 130 of the apparatus 100 about an angle 205. As door 130 is closed, an over-center movement mechanism 135 causes receiver fitment 125 to slide about an axis 210 and cover canister fitment 120. For example, the over-center movement mechanism 135 may engage with a cam on the door 130. As the door 130 is moved, the over-center movement mechanism 135 may travel along the cam in such a way as to cause motion about axis 210. The axis 210 may be a vertical axis and/or may be parallel to an axis of a fluid flow pathway between the canister 110 and the receiver fitment 125. In various embodiments, a different sliding mechanism may be employed to cause canister 100 to be inserted into receiver fitment 125 as door 130 is closed. Additionally, receiver fitment 125 may be designed to clamp over canister fitment 120 once it is connected to canister fitment 120 so as to further secure canister 110. For example, a lower most portion of the receiver fitment 125 may be pushed onto the top surface of the flange on the canister fitment 120.

As receiver fitment 125 connects with canister fitment 120, an o-ring of canister fitment 120 seals the connection. In various embodiments of the invention, a valve opening component of receiver fitment 125 may force open a valve of canister 110 upon or after its connection to canister fitment 120. The opening of the valve may allow gas to flow from canister 110 to canister connection apparatus 100. In various embodiments, the o-ring of the canister fitment 120 seals the connection prior to the valve opening component of the receiver fitment 125 opening the valve of canister 110. In various embodiments, canister connection apparatus 100 may be designed so that the opening of canister valve occurs when or after door 130 has already been substantially closed.

The connection between receiver fitment 125 and canister fitment 120 effectively shield the user from accidental gas discharge in case of a defective o-ring or other anomaly. Moreover, since the canister valve may be opened only as door 130 is lowered, door 130 may also serve as shield protecting the user from accidental gas discharge.

As door 130 is opened about angle 205, receiver fitment 125 may be disconnected from canister fitment 120 in a similar way that it was connected to canister fitment 120 (e.g., about axis 210). In various other embodiments, canister fitment 120 may be disconnected from receiver fitment 125 in a similar way that it was connected to receiver fitment 125. The disconnection between receiver fitment 125 and canister fitment 120 may shut the canister valve, thereby stopping the gas flow. In this way, the user may be shielded from the potential gas discharge from disconnecting canister 110 from apparatus 100 in a similar way in which the user was shielded when connecting canister 110. In various embodiments, the o-ring of the canister fitment 120 seals the connection until after the valve opening component of the receiver fitment 125 disengages with the valve of canister 110 and allows the valve of the canister 110 to close.

Figure 10:
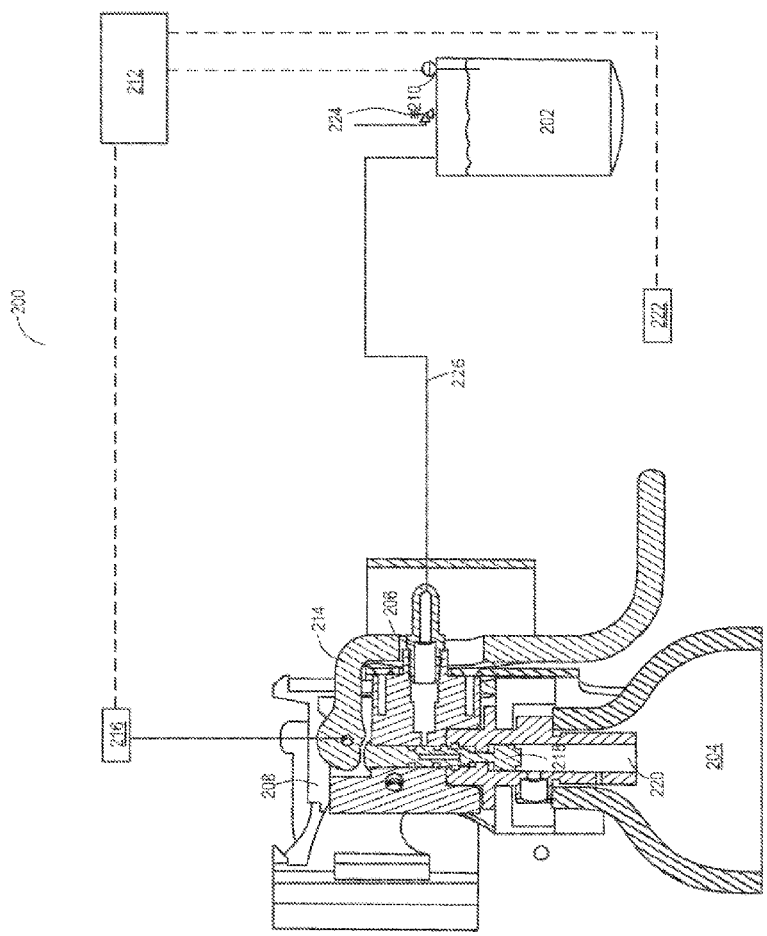
FIG. 10 illustrates a carbon dioxide system in accordance with the present disclosure.

Consistent with embodiments of the invention, canister connection apparatus 100 may comprise a locking mechanism. For example, door 130 may be latched to housing 105 when closed. The latch may comprise, but is not limited to, for example, an electrical solenoid. The opening of door 130 may be, for example, password protected. Any suitable locking mechanism may be used. In some embodiments, a closed door sensor 222 may be used to ensure that the door is closed and prevent the opening of the canister valve if the door is not closed. In some embodiments, the latch or locking mechanism may serve as a closed door sensor. As shown in FIG. 10, the controller 212 may prevent the solenoid 216 from being activated to open the canister valve until the closed door sensor 222 indicates that the door 130 is closed.

Figure 4:
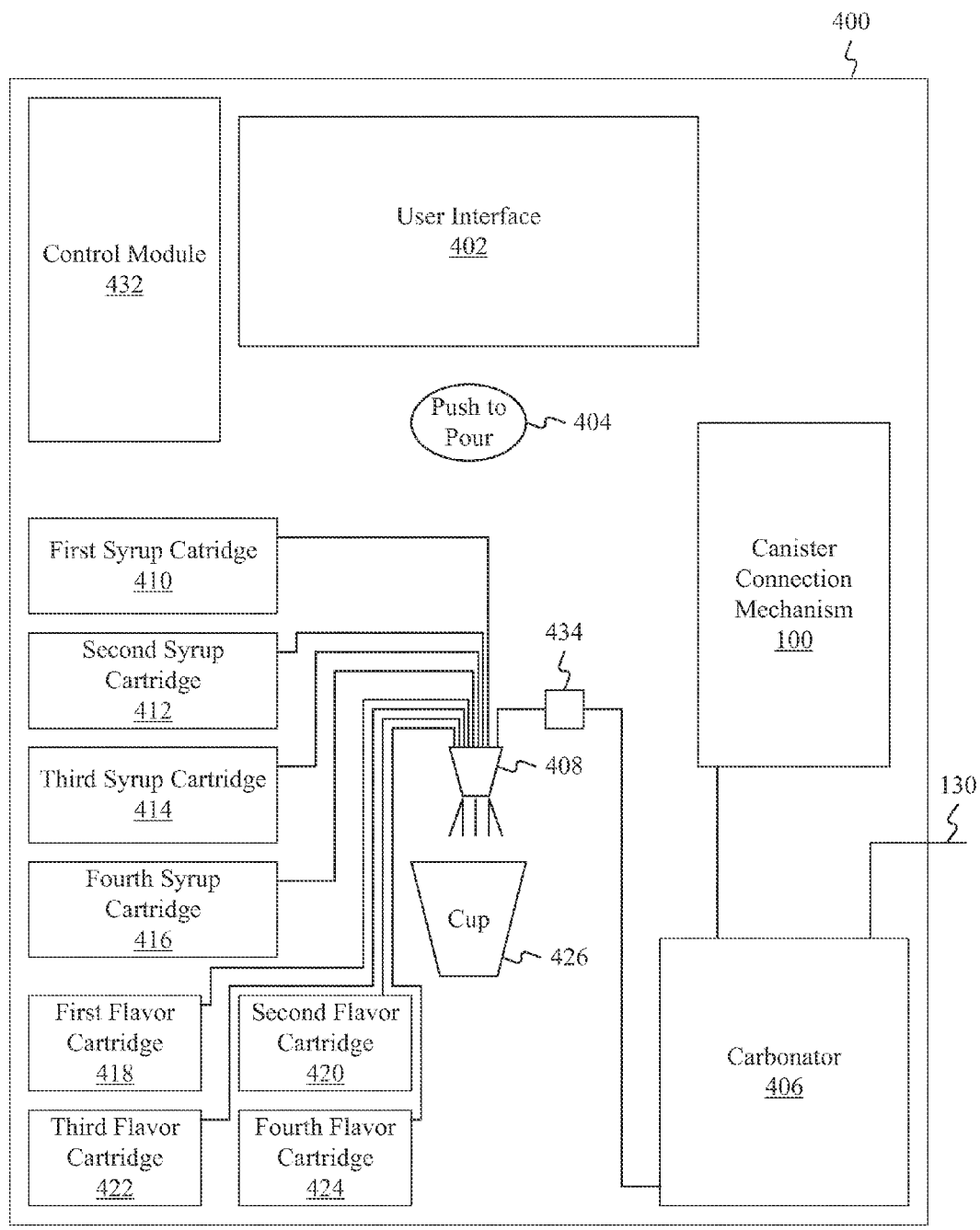
FIG. 4 illustrates a block diagram of a system including a canister connection apparatus.

FIG. 4 illustrates a system comprising canister connection apparatus 100. The system may comprise a beverage dispenser 400 and includes a user interface 402, a push to pour button 404, a carbonator 406, and a nozzle 408. Syrups may be stored in a plurality of syrup cartridges (e.g., a first syrup cartridge 410, a second syrup cartridge 412, a third syrup cartridge 414, and a fourth syrup cartridge 416). Flavors may be stored in a plurality of flavor cartridges (e.g., a first flavor cartridge 118, a second flavor cartridge 420, a third flavor cartridge 422, a fourth flavor cartridge 424). The plurality of syrup cartridges and the plurality of flavor cartridges are connected to the nozzle 408.

During operation, a user may select a beverage using the user interface 402. When the user presses the push to pour button 404, carbonated water flows from the carbonator 406 to the nozzle 408 and the appropriate syrups and/or flavors flow from the plurality of syrup cartridges and/or the plurality of flavor cartridges. In a post mix beverage dispenser the, the syrups, flavors, and carbonated water mix about the nozzle 408. For example, if a user selects a cherry flavored cola, carbonated water will flow from the carbonator 406 to the nozzle 408. The cola syrup and cherry flavoring will flow from the appropriate cartridges to the nozzle 408. The ingredients will then flow through the nozzle 408 and may air mix within the exiting fluid stream and a cup 426.

The carbonated water is formed within the carbonator 406. To form the carbonated water, $CO_2$ flows from a carbon dioxide source (e.g., canister connection apparatus 100) to the carbonator 406. Still water may flow into the carbonator 406 from an external source 430. The cooperation of the beverage dispenser may be controlled by a control module 432. The control module 432 may also monitor a backpressure, via a pressure sensor 434, within the plumbing between the carbonator 406 and the nozzle 408.

Figure 5B:
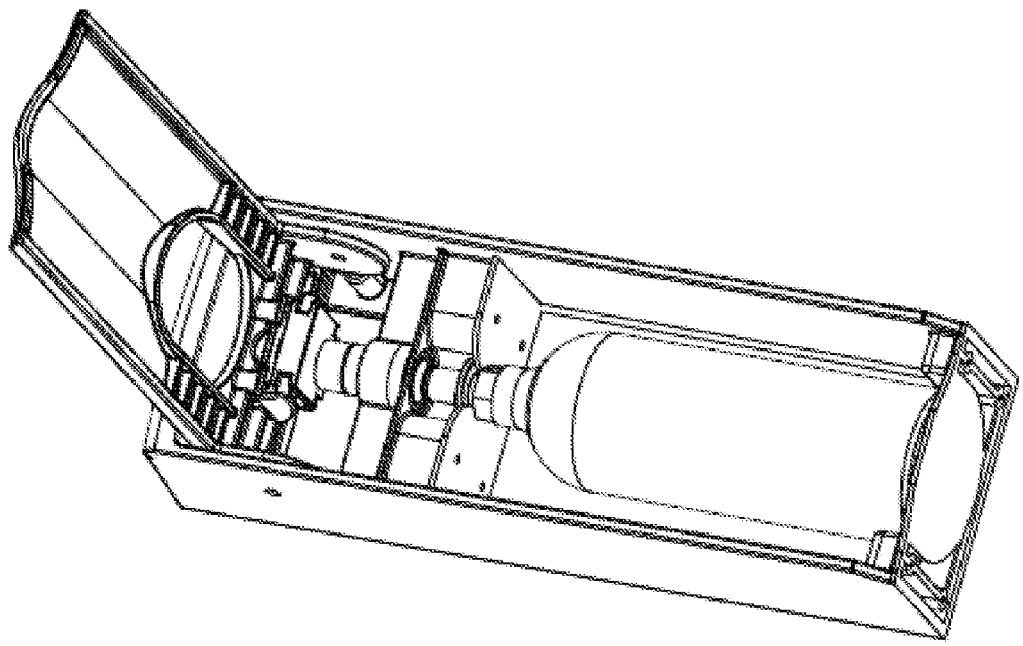
FIGS. 5a-5b illustrate three dimensional views of the canister connection apparatus.
Figure 5A:
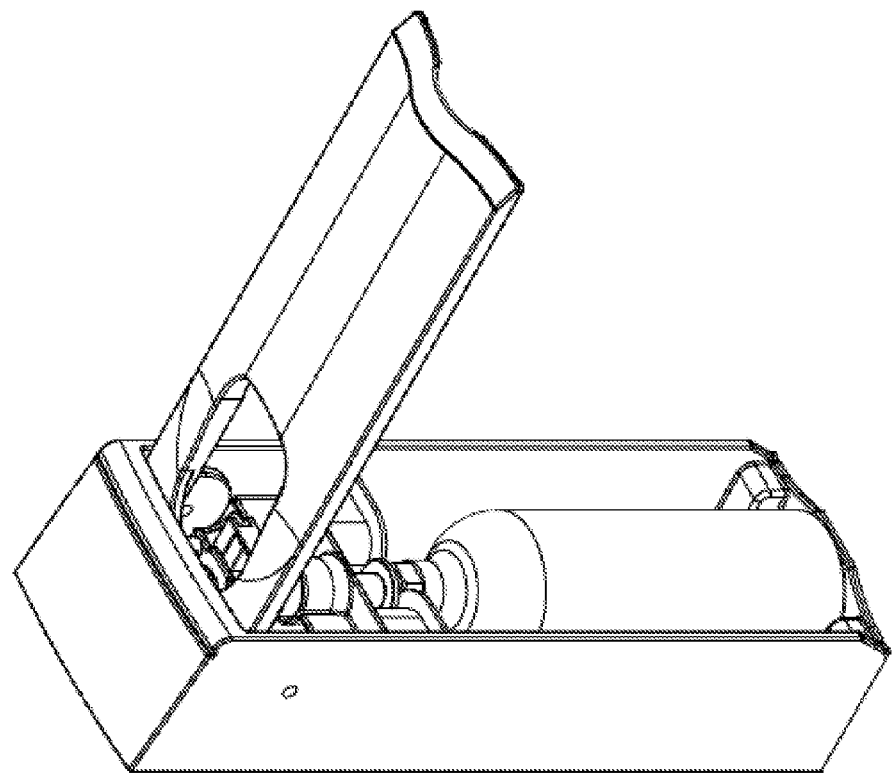
Figure 6B:
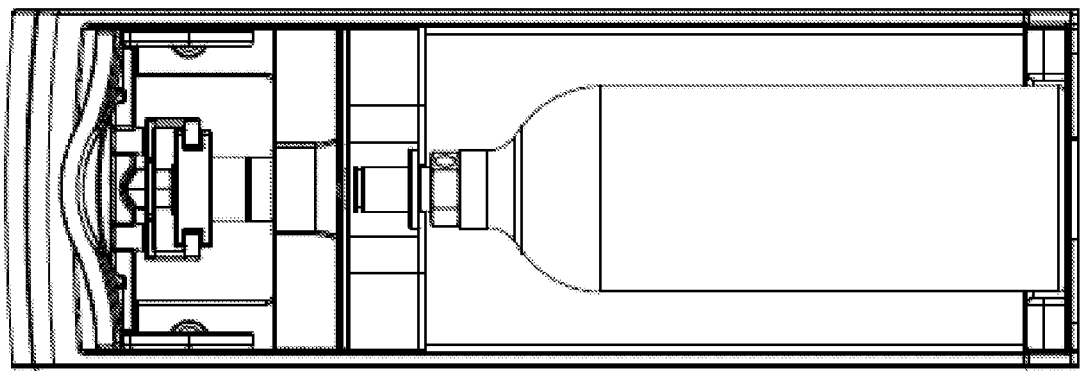
FIGS. 6a-6b illustrate a front view and a back view of the canister connection apparatus.
Figure 6A:
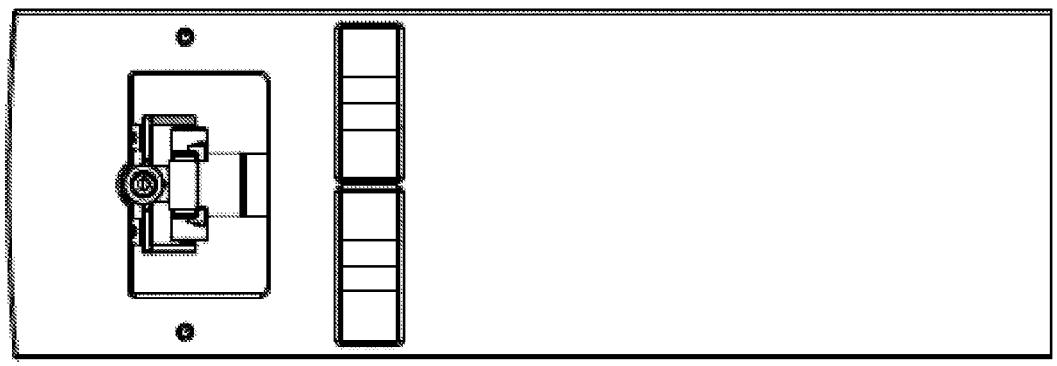
Figure 7B:
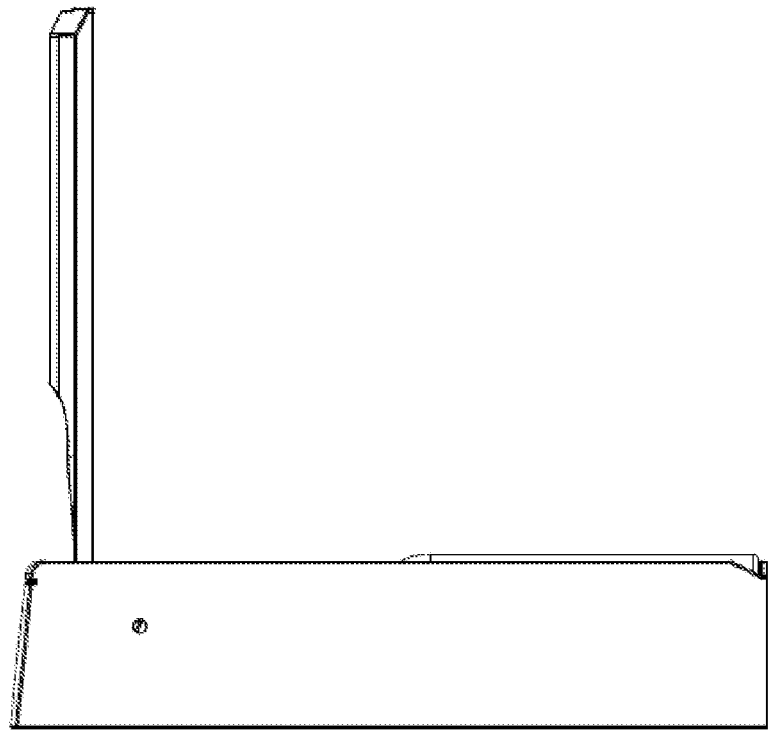
FIGS. 7a-7b illustrate side views of the canister connection apparatus.
Figure 7A:
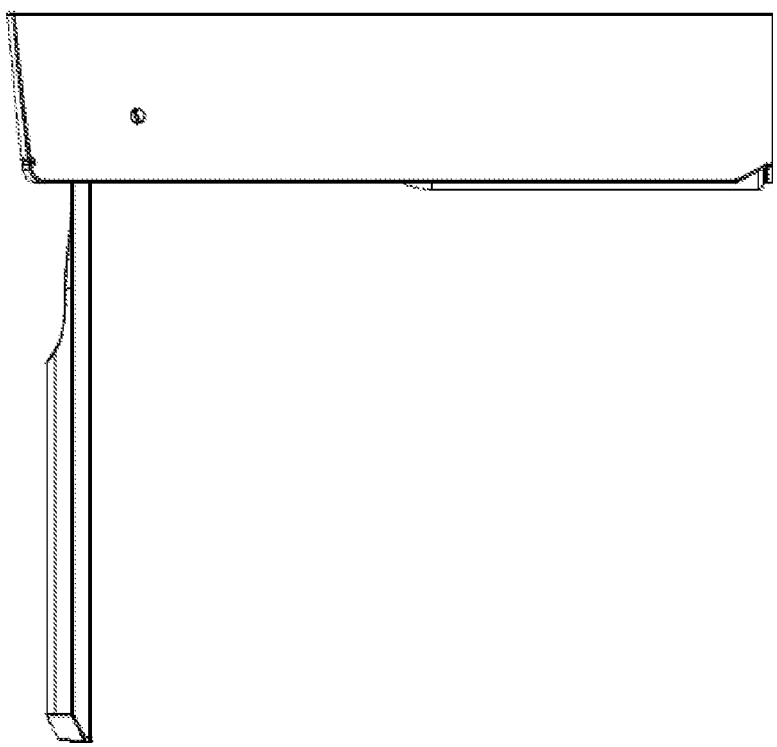

FIG. 5a is a first three dimensional view of canister connection apparatus 100. FIG. 5b is a second three dimensional view of canister connection apparatus 100. FIG. 6a is a front view of canister connection apparatus 100. FIG. 6b is a back view of canister connection apparatus 100. FIG. 7a is a first side view of canister connection apparatus 100. FIG. 7b is a second side view of canister connection apparatus 100. FIG. 8a is a front view door 130. FIG. 8b is a back view door 130. FIGS. 9a-9B are three dimensional view of canister 110, nest 115, canister fitment 120, receiver fitment 125, and movement mechanism 135.

FIG. 10 is a diagram of a carbon dioxide system 200. The carbon dioxide system 200 can include a carbonation tank 202, a $CO_2$ canister 204, a carbonator throttle 206 (e.g., sintered metal disc) and a quick connect mechanism 208. In some embodiments, the quick connect mechanism 208 may be embodied as described above. The carbonator throttle 206 may include a piston, a butterfly valve, or any other electromechanical obstructions known in the art for limiting a flow rate of a fluid through a passage. The carbon dioxide system 200 is constructed to prevent over pressure within the system. The carbonation tank 202 can include a pressure sensor 210 constructed to detect pressure within the carbonation tank 202. In one example, the pressure sensor 210 can be in communication with a controller 212.

The quick connect mechanism 208 can include a lever 214 and a solenoid 216. In the depicted example, the quick connect mechanism 208 is shown and described for a $CO_2$ canister with a vertical outlet. In one example, the quick connect mechanism 208 can be used for $CO_2$ canisters that have a right-angled outlet. In other examples, the quick connect mechanism 208 can be used for $CO_2$ canisters that otherwise have outlets that are not vertical.

In certain examples, the controller 212 can be in communication with the solenoid 216 to energize the solenoid 216. The controller 212 may communicate with the lever 214 via a solenoid 216 or any other electromechanical devices known in the art. The solenoid 216 can be configured to pull the lever 214 that presses a release pin 218 (e.g., schrader valve) down within the $CO_2$ canister 204 to open a passageway 220 to release gas that can flow through the carbonator throttle 206 and a fitting to feed line 226 which can lead to a top of the carbonation tank 202 to carbonate. In one example, the solenoid 216 can release gas from the CO$_2$ canister 204 through the line 226 each time the pressure falls below a set point predetermined by the user. In some embodiments, the controller 212 may prevent the solenoid 216 from being energized unless the closed door sensor 222 indicates that the door 130 is closed.

In certain examples, the carbonator throttle 206 can be constructed to restrict the flow rate of the gas coming out of the CO$_2$ canister 204 under high pressure to a reduced flow rate once the release pin 218 is pressed. The carbonator throttle 206 provides a very high restriction to the gas flow rate so the gas is released in a control way which can help prevent the carbonation tank 202 from being over pressurized. Therefore, the carbonator throttle 206 establishes a maximum throttle flow rate of CO$_2$ from the CO$_2$ canister 204 to the carbonation tank 202. In the carbon dioxide system 200, regulators can be eliminated because the carbonator throttle 206 allows the carbon dioxide system 200 to react slowly such that the carbonation tank 202 can adapt the new pressure of the gas in a controllable way. In one example, the carbonation tank 202 can include a pressure relief valve 224 that can relieve the pressure if the carbon dioxide system 200 supplies excess CO$_2$ to the carbonation tank 202. In some examples, the pressure relief valve 224 can act as a back up to help relieve the high pressure of gas in the event of a failure of the pressure sensor 210 or if the release pin 206 were to get stuck. The pressure relief valve 224 may enable CO$_2$ to be vented to the atmosphere once a predetermined pressure has accumulated within the carbonation tank 202. Upon the pressure within the carbonation tank 202 falling below a second predetermined pressure, the pressure relief valve may close. The pressure relief valve may be designed to enable venting gas (e.g. CO$_2$) from the carbonation tank 202 up to a maximum venting flow rate. In some embodiments, the maximum throttle flow rate is less than the maximum venting flow rate. Therefore, even if the release pin 218 is stuck open, the pressure relief valve 224 will be able to vent excess CO$_2$ to atmosphere faster than the CO$_2$ is being supplied to the carbonation tank 202. Accordingly, excess pressures will not build up within the carbonation tank 202.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A system comprising:
    a canister comprising a canister fitment;
    a carbonation tank configured to receive gas from the canister;
    a receiver fitment comprising a valve opening component configured to open a valve of the canister and connect to the canister fitment, wherein the receiver fitment is further configured to seal and cover the canister fitment, and wherein the receiver fitment comprises a carbonator throttle configured to restrict gas flow of gas coming out of the valve of the canister to a reduced flow rate to the carbonation tank; and
    a controller in communication with the receiver fitment and the carbonation tank.

2. The system of claim 1, wherein the canister is a carbon dioxide source configured to deliver carbon dioxide gas to the carbonation tank.

3. The system of claim 1, wherein the carbonation tank comprises a pressure sensor configured to detect pressure within the carbonation tank.

4. The system of claim 3, wherein the pressure sensor is in communication with the controller.

5. The system of claim 1, wherein the carbonation tank comprises a pressure relief valve configured to exhaust the received carbon dioxide upon command from the controller, wherein the pressure relief valve has a higher maximum allowable flow rate than a maximum allowable flow rate of the carbonator throttle.

6. The system of claim 1, wherein the carbonator throttle may be actuated by the controller in communication with the receiver fitment.

7. The system of claim 6, wherein the controller may actuate the carbonator throttle by energizing a solenoid in communication with the controller and the carbonator throttle.

8. The system of claim 1, further comprising a door sensor in communication with the controller.

9. The system of claim 8, wherein the controller restricts gas flow to the carbonation tank via the carbonator throttle until the door sensor indicates a door housing the canister has been closed.

* * * * *